United States Patent [19]

Smith et al.

[11] Patent Number: 4,575,584
[45] Date of Patent: Mar. 11, 1986

[54] FAIL-SAFE DIGITAL PHONE

[75] Inventors: Dennis K. Smith, Ft. Worth; John J. Holesha, Plano, both of Tex.

[73] Assignee: Honeywell Inc., Phoenix, Ariz.

[21] Appl. No.: 628,102

[22] Filed: Jul. 5, 1984

[51] Int. Cl.[4] ............................................. H04M 3/58
[52] U.S. Cl. ............................... 179/81 R; 179/27 G
[58] Field of Search ............ 179/81 R, 27 G, 18 AD, 179/18 C; 370/16

[56] References Cited

U.S. PATENT DOCUMENTS 4,100,375 7/1978 Noller ........................ 179/18 AD X
4,211,895 7/1980 Davis et al. ................ 179/18 AD X Primary Examiner—James L. Dwyer
Attorney, Agent, or Firm—A. A. Sapelli; J. S. Solakian

[57] ABSTRACT

A fail-safe digital telephone set of the present invention is operatively connected to a digital PBX which has at least one digital telephone set attached thereto and which further interfaces with telephone lines to a central office. The fail-safe digital phone includes logic for providing digital communication of voice information with the PBX, logic for providing analog communication of voice information with the telephone lines, and a switching element which activates the digital logic and connects the digital logic to the PBX.

In the event of failure of the PBX, the switching element activates the analog logic and connects the analog logic to the telephone lines.

10 Claims, 3 Drawing Figures

F I G. I

PRIOR ART

4,575,584

FAIL-SAFE DIGITAL PHONE

BACKGROUND OF THE INVENTION

This invention relates to a telephone set, and more particularly, to a fail-safe digital telephone set.

New digital telephone sets associated with a digital PBX are designed to be compatible with the digital interface requirements of the digital PBX. The digital PBX provides the switching interface and logic between associated digital phones. Since the protocol established by the telephone company for initiating and completing a phone call from one subscriber phone to another via the telephone lines is essentially analog in nature, the digital PBX also provides a digital to analog and analog to digital interface for the associated digital phones when the associated digital phones are to communicate outside the PBX environment utilizing telephone lines provided by the telephone company. Generally power to the associated digital phones are provided by the PBX. When the power from the PBX is lost or PBX has a malfunction, the digital phones become inoperable; hence, communication outside the PBX environment is disabled, thereby losing the capability of calling for the assistance or services of a repairman.

Hence, there is a need to provide at least one digital phone which is capable of communicating outside the PBX environment in the case of such catastrophic failure. The present invention provides a telephone set which in its normal operating mode is compatible with the digital interface and digital protocol of the PBX system, and which, upon a failure of the PBX, is compatible with the analog interface of the telephone lines thereby permitting communication outside of the PBX environment in the failure mode.

SUMMARY OF THE INVENTION

Therefore, there is supplied by the present invention a fail-safe digital telephone set, operatively connected to a digital PBX having at least one digital telephone set operatively connected thereto, the digital PBX further operatively connected to at least one telephone line having an analog protocol. The digital PBX provides an interface to the telephone lines for each of the digital telephone sets and for the fail-safe digital telephone set in a normal operating mode. The fail-safe digital telephone set comprises a first element for providing digital communication of voice information with the digital PBX, and a second element for providing analog communication of voice information with the telephone lines. A switch element, having a first and a second terminal corresponding to a first and a second select position, respectively, is also included, the first element operatively connected to the first terminal and the second element operatively connected to the second terminal, for selecting between the first select position and the second select position in response to a control signal thereby causing the first element to be operative when the first select position is chosen and causing the second element to be operative when the second select position is chosen. The switch element operatively connects the first element to the digital PBX in a normal operating mode and operatively connects the second element to the telephone lines in a failure mode.

Accordingly, it is the object of the present invention to provide a telephone set for interfacing with a digital PBX in a normal operating mode.

It is still a further object of the present invention to provide a telephone set for interfacing with a digital PBX in a normal operating mode and for interfacing with the analog lines provided by the telephone company in a non-normal (or failure mode) environment.

These and other objects of the present invention will become more apparent when taken in conjunction with the following description and attach drawings, wherein like characters indicate like parts, and which drawings form a part of the present application.

DETAIL DESCRIPTION

Figure 1:
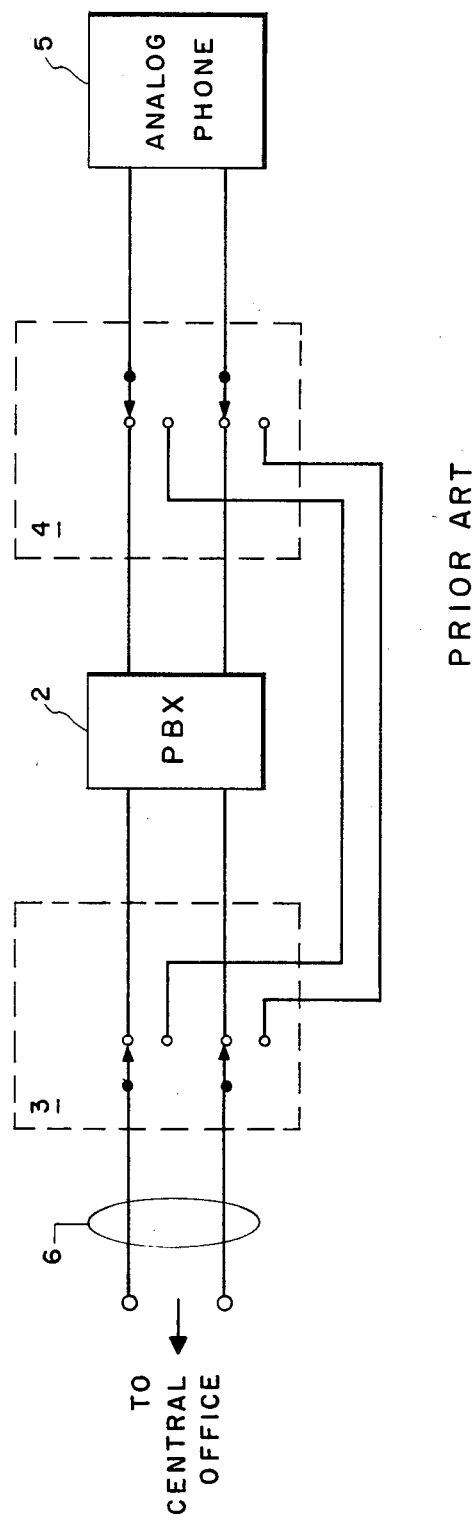
FIG. 1 shows a switching arrangement of an analog PBX system of the prior art for permitting communication outside the PBX environment in the event of a failure.

Referring to FIG. 1, there is shown a switching arrangement of an analog PBX system of the prior art for permitting communication outside the PBX environment in the event of a failure. A PBX 2 interfaces with lines 6 from a central office of the telephone company through a switch 3. An analog phone 5 is operatively connected to PBX 2 through a switch 4. (It is to be understood that other analog phones (not shown) are also connected to PBX 2, not necessarily through a switch.) In the event of a failure of PBX 2, switches 3,4 are operated thereby switching analog phone 5 directly to the central office. In this manner, calls may be made outside the PBX environment from the analog phone 5. The switching arrangement as depicted in FIG. 1 is feasible since the analog phone is compatible with the interface requirements of the lines 6. In the case where the phone is a digital phone, the switching arrangement of the prior art of FIG. 1, is not feasible since the digital phone interface is incompatible with the interface requirements of the lines 6.

Figure 2:
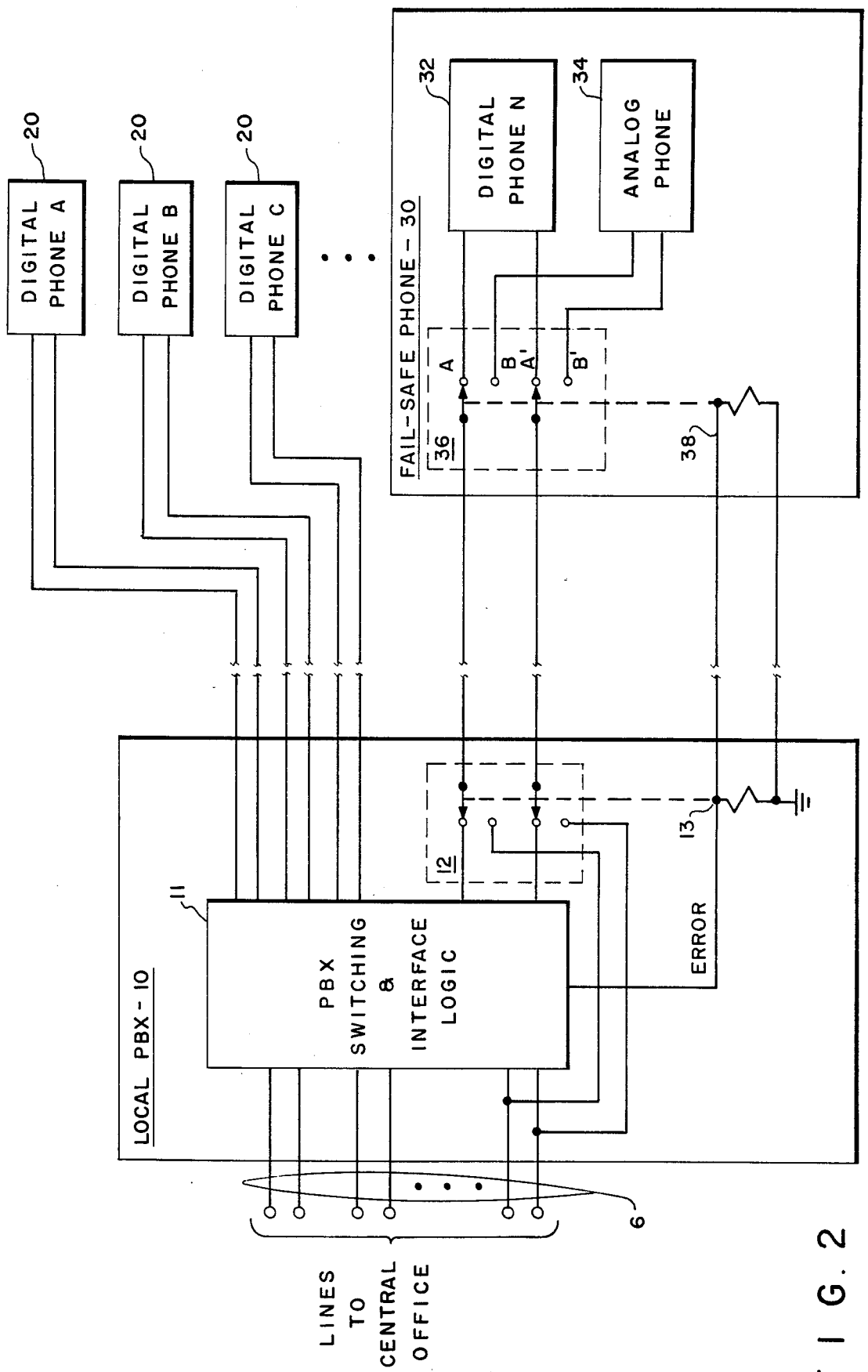
FIG. 2 shows a block diagram of a digital PBX system having at least one fail-safe digital phone.

Referring to FIG. 2, there is shown a block diagram of a digital PBX system having at least one fail-safe digital phone. The digital PBX system includes the local PBX 10 which interfaces with at least one set of lines 6 from the central office. The local PBX 10 has operatively connected thereto a plurality of digital phones 20, and at least one fail-safe digital phone (or more simply referred to herein as fail-safe phone) 30. The local PBX includes the PBX switching and interface logic 11 which allows the digital phones 20 to communicate with each other, and which interfaces the digital phones 20 to the lines 6 of the central office. The local PBX 10 further includes a switch 12 which interfaces the fail-safe phone 30 directly to the PBX switching and interface logic 11 or directly to lines 6, the switch 12 being controlled by a relay 13. Although only one fail-safe phone 30 is shown, it is to be understood that any number of fail-safe phones may be included in the PBX system.

The telephone set, which is the fail-safe phone 30 of the present invention, has included therein digital logic which performs the function of a digital phone, denoted digital phone N 32, and also has included therein analog logic which performs the functions of an analog phone, denoted as analog phone 34. The digital phone N 32 and the analog phone 34 are each connected to a corresponding set of contacts, A and B respectively, of a switch 36, switch 36 being controlled by a relay 38. Both relays 13, 38, are controlled by a control signal ERROR and are switched in synchronism. In a normal operating mode or environment of the PBX system, the fail-safe phone 30 operates as a digital phone compatible with digital phone A 20, digital B 20, digital C 20, . . . and with the local PBX 10. As mentioned above the digital phones 20 are powered by the PBX switching and interface logic 11 of local PBX 10.

Figure 3:
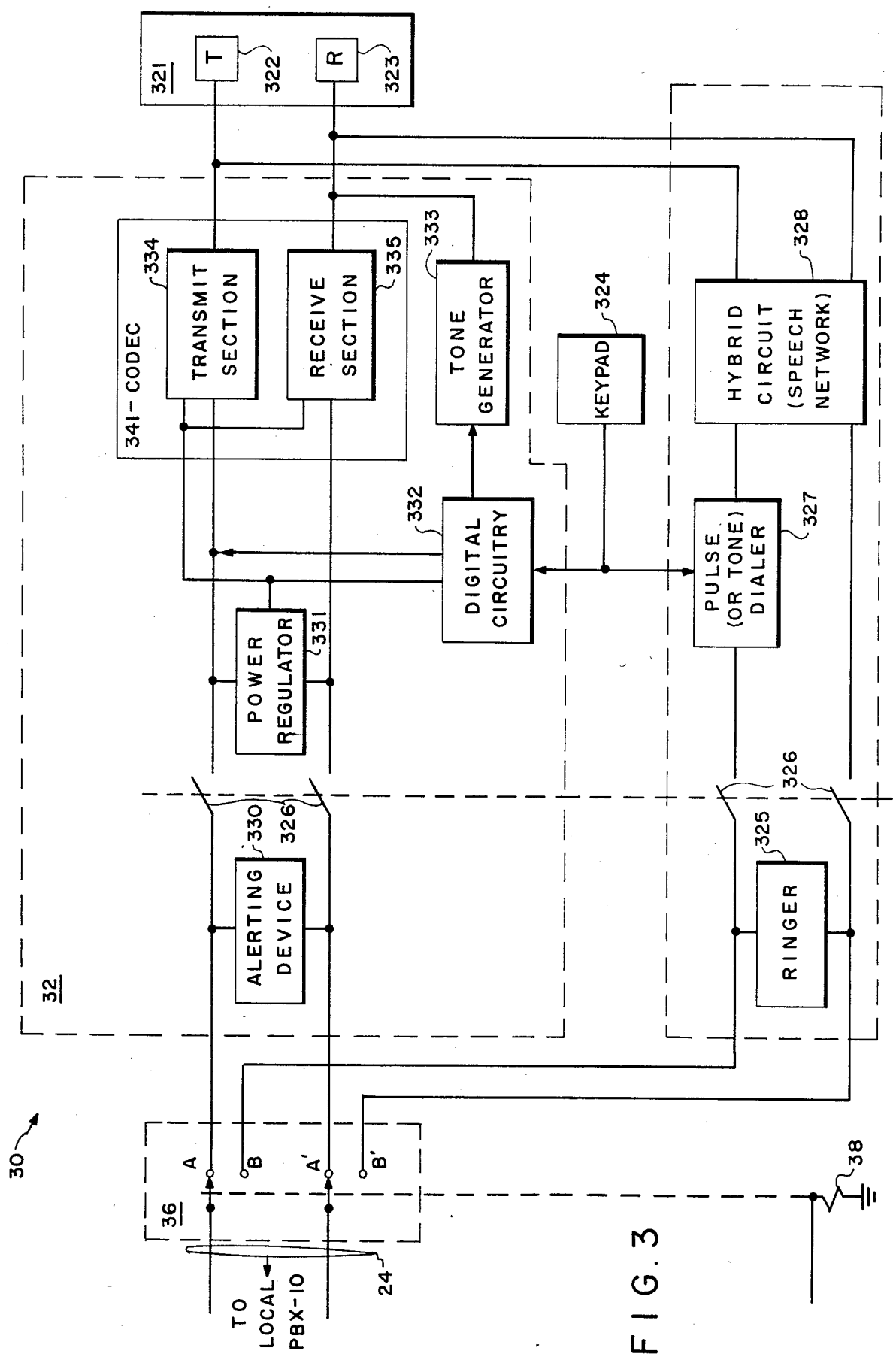
FIG. 3 shows a block diagram of a fail-safe digital phone of the present invention.

In the event of a power loss or of a failure with the PBX switching and interface logic 11, the control signal ERROR is active, deenergizing the relays 13, 38 (i.e., in the normal operating mode the relays 13,38 are energized and the loss of power causes the relay to switch to the fail-safe position or the normally closed position). Switch 36 is then set such that analog phone 34 is operatively connected to the local PBX 10 and digital phone N 32 is disconnected from the local PBX 10. In addition, switch 12 is set such that the analog phone 34 is directly connected to line 6 of the central office, the direct connection being feasible since analog phone 34 is compatible with the analog protocol and requirements of lines 6 established by the telephone company, thereby permitting at least the fail-safe phone 30 the capability of communicating outside the PBX environment. Referring to FIG. 3, there is shown a functional block diagram of fail-safe phone 30 of the present invention. The fail-safe digital phone 30 includes the switch 36, relay 38, digital phone N 32, and analog phone 34. A handset 321, which includes a transmitting element 322 and a receiving element 323, and a keypad 324, are shared by the analog phone 34 and digital phone N 32.

The analog phone 34 includes the elements of a conventional telephone set. A ringer 325 is attached to the B terminals of switch 36 such that it will be connected to the lines 24 to the local PBX 10 even though a switch hook 326 is open (i.e., the handset 321 is in the cradle of the telephone set). A pulse (or tone) dialer 327 is included in the circuit which accomplishes the function of signalling the central office thereby providing a proper analog interface with lines 6 to the central office. The pulse dialer 327 can be in integrated circuit form, e.g. TI TCM1101 integrated circuit chip, which operates in conjunction with the keypad 324. A hybrid circuit 328, generally well known in the art, is included in the analog logic 34 and interfaces with handset 321. An integrated circuit two-way speech circuit can be utilized, such as TI TCM 1705 and TCM 1706. The Motorola 34011 (electronic telephone chip) directly interfaces to a Keypad and can be utilized in the implementation of the fail-safe phone 30. In the fail-safe condition (i.e., when a failure has occurred in the local PBX 10 and the analog phone 34 is operative) the fail-safe phone 30 provides the basic communication function and the features included with the digital phone 32 are inoperative. The power, to operate the fail-safe phone 30 (i.e., the analog phone 34) in the failed condition of local PBX 10, is supplied from the central office. The analog phone 34 does not require any power from the local PBX 10 (since one of the failure modes includes a lack of power from the local PBX 10).

The digital phone 32 includes an alerting device 330 operatively connected to the A terminals of switch 36. In a normal operating mode, the digital phone 32 is operatively connected to the switching and interface logic 11 of the local PBX 10 via the A contacts of switch 36. The digital phone 32 receives power from the switching and interface logic 11, (although power may be obtained from the AC service lines, in which case a failure in power from the power company or any failure in delivery of the AC service would cause the digital phones 20 to be inoperative). The alerting device 330 is included in the circuit of the digital phone 32 such that the alerting device 330 is always connected to the PBX 10 regardless of the condition of the switch hook 326. The alerting device 330 is compatible with the ringing signal provided by the switching and interface logic 11. The alerting device 330 can be implemented by an integrated circuit multi tone ringer, such as an integrated circuit from Texas Instruments (TI) TCM 1506. A power regulator 331 converts the power supplied by the switching and interface logic 11 to the levels required by the various integrated circuit chips of the digital phone 32.

Digital circuitry 332 interacts with keypad 324 to generate the digital dialing signals to the switching and interface logic 11, and also provides the signals corresponding to the digits dialed to a tone generator 333 which in turn supplies the tones (also known as pacifier tones) to the receiver 323 via the tone generator 333. Codec (or digitizer) 341, includes a transmit section 334 which converts the analog speech signals to digital signals for transmission to the PBX 10, and a receive section 335 which converts the received digital signals to analog in order to be comprehensible to the listener. The codec 341, can be of the type of integrated circuit clip such as the Motorola integrated circuit, MC 3419 or MC 3519. It will be understood by those skilled in the art that a filter (not shown) may be necessary in order to optimize the interface between the Codec 341 with the handset 321. Although, not shown, the digital phone 32 can include a microprocessor, such as an integrated circuit chip provided by TI TMS 1000. Telephone sets with microprocessors can provide capabilities beyond the standard features of receiving and transmitting sound, ringing, and dialing. The number and level of capabilities of the features provided through the use of a microprocessor converts a telephone set into what is commonly known as an "intelligent" telephone set. The features of such an intelligent phone can include memory to hold phone numbers for speed dialing. Additional features can include such things as visual digital display, a time of day clock, an elapsed time indicator for the current call, an alarm for callbacks, a built in calculator with the ability to compute the approximate cost of a toll call, automatically redialing of busy numbers and a host of other features. Although the structure of the digital phone may vary it is to be understood by those skilled in the art that the any digital phone included in the fail-safe phone 30 is embodied within the present invention.

While there has been shown what is considered to be a preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

What is claimed is:

1. A fail-safe digital telephone set, operatively connected to a digital PBX having at least one digital telephone set operatively connected thereto, said digital PBX further operatively connected to at least one telephone line having an analog protocol, said digital PBX providing an interface to said telephone lines for each of said digital telephone sets and for said fail-safe digital telephone set in a normal operating mode, said fail-safe digital telephone set comprising:

(a) first means for providing digital communication of voice information with said digital PBX;

(b) second means for providing analog communication of voice information with said telephone lines; and (c) switch means, having a first and a second terminal corresponding to a first and a second select position, respectively, said first means operatively connected to said first terminal and said second means operatively connected to said second terminal, for selecting between said first select position and said second select position in response to a control signal thereby causing said first means to be operative when said first select position is chosen and causing said second means to be operative when said second select position is chosen, to operatively connect said first means to said digital PBX in a normal operating mode and to operatively connect said second means to said telephone lines in a failure mode.

2. A fail-safe digital telephone set, according to claim 1, wherein said first means comprises:
a digital telephone.

3. A fail-safe digital telephone set, according to claim 2, wherein said second means comprises:
an analog telephone.

4. A fail-safe digital telephone set, according to claim 1, wherein said second means comprises:
an analog telephone.

5. A fail-safe digital telephone set, according to claim 2, wherein said digital telephone comprises:

(a) alerting means, operatively connected to said first terminal of said switch means, for signaling that a call is waiting;

(b) codec means, operatively connected to said alerting means, having an input terminal and an output terminal adapted to transmit and receive voice information respectively, for providing an analog/digital interface between said digital PBX and the voice information;

(c) circuit means, operatively connected to said alerting means, having an input terminal adapted to receive address signals, for providing compatible address signals to the digital PBX in response to the received address signals thereby indicating to the digital PBX that a call is being initiated; and (d) switchhook means, interposed between the alerting means, and the codec means and circuit means, for disconnecting the codec means and circuit means from the alerting means when no call is in progress.

6. A fail-safe phone according to claim 5, wherein said digital telephone further comprises:
tone generator means, operatively connected to said circuit means and to the output terminal of said codec means, for providing a sidetone signal at the output terminal of said codec means.

7. A fail-safe digital telephone set, according to claim 3, wherein said analog telephone comprises:

(a) ringer means, operatively connected to the second terminal of said switch means, for signaling that a call is waiting;

(b) dialer means, operatively connected to said ringer means, having an input terminal adapted to receive address signals, for providing compatible address signals to the telephone lines in response to the received address signals thereby complying with the analog protocol for initiating a call via the telephone lines;

(c) hybrid circuit means, operatively connected to the ringer means, having a receive terminal and a transmit terminal adapted to receive and transmit voice information respectively, for coupling the voice information between the telephone lines and the receive and transmit terminals of said hybrid circuit means; and (d) switchhook means, interposed between the ringer means, and the dialer means and the hybrid circuit means, for disconnecting the dialer means and the hybrid circuit means from the ringer means when no call is in progress.

8. A fail-safe digital telephone set, according to claim 4, wherein said analog telephone comprises:

(a) ringer means, operatively connected to the second terminal of said switch means for signalling that a call is waiting;

(b) dialer means, operatively connected to said ringer means, having an input terminal adapted to receive address signals, for providing compatible address signals to the telephone lines in response to the received address signals thereby complying with the analog protocol for initiating a call via the telephone lines;

(c) hybrid circuit means, operatively connected to the ringer means, having a receive terminal and a transmit terminal adapted to receive and transmit voice information respectively, for coupling the voice information between the telephone lines and the receive and transmit terminals of said hybrid circuit means; and (d) switchhook means, interposed between the ringer means, and the dialer means and the hybrid circuit means, for disconnecting the dialer means and the hybrid circuit means from the ringer means when no call is in progress.

9. A fail-safe digital telephone set, operatively connected to a digital PBX having at least one digital telephone set operatively connected thereto, said digital PBX further operatively connected to at least one telephone line having an analog protocol, said digital PBX providing an interface to said telephone lines for each of said digital telephone sets and for said fail-safe digital telephone set in a normal operating mode, said fail-safe digital telephone set comprising:

(a) first means for providing digital communication of analog information with said digital PBX;

(b) second means for providing analog communication of analog information with said telephone lines; and (c) switch means, having a first and a second terminal corresponding to a first and a second select position, respectively, said first means operatively connected to said first terminal and said second means operatively connected to said second terminal, for selecting between said first select position and said second select position in response to a control signal thereby causing said first means to be operative when said first select position is chosen and causing said second means to be operative when said second select position is chosen, to operatively connect said first means to said digital PBX in said normal operating mode and to operatively connect said second means to said telephone lines in a failure mode.

10. A fail-safe digital telephone set, operatively connected to a digital PBX having at least one digital telephone set operatively connected thereto, said digital PBX further operatively connected to at least one telephone line having an analog protocol, said digital PBX providing an interface to said telephone lines for each of said digital telephone sets and for said fail-safe digital telephone set in a normal operating mode, said fail-safe digital telephone set comprising:

(a) first means for providing digital communication of analog voice information with said digital PBX;

(b) second means for providing analog communication of analog voice information with said telephone lines;

(c) switch means, having a first and a second terminal corresponding to a first and a second select position, respectively, said first means operatively connected to said first terminal and said second means operatively connected to said second terminal, for selecting between said first select position and said second select position in response to a control signal thereby causing said first means to be operative when said first select position is chosen and causing said second means to be operative when said second select position is chosen, to operatively connect said first means to said digital PBX in a normal operating mode and to operatively connect said second means to said telephone lines in a failure mode;

(d) keypad means, operatively connected to said first means and said second means, for providing input address signals to initiate a call to a predetermined corresponding telephone set; and (e) handset means, operatively connected to said first means and said second means, for converting between analog signals and audio information.

* * * * *